United States Patent [19]

Costemalle et al.

[11] Patent Number: 5,310,802

[45] Date of Patent: May 10, 1994

[54] ELASTOMERIC COMPOSITIONS AND PROCESSES FOR THEIR PRODUCTION

[75] Inventors: Bernard J. Costemalle, Rhode St. Genese; Pierre T. Hous, Steenokkerzeel, both of Belgium

[73] Assignee: Exxon Chemical Patents Inc., Linden, N.J.

[21] Appl. No.: 25,909

[22] Filed: Mar. 3, 1993

Related U.S. Application Data

[63] Continuation of Ser. No. 873,527, Apr. 21, 1992, abandoned, which is a continuation of Ser. No. 377,347, Jul. 7, 1989, abandoned.

[30] Foreign Application Priority Data

Jul. 8, 1988 [GB] United Kingdom ................. 8816310

[51] Int. Cl.$^5$ .......................... C08L 15/02; C08L 9/00
[52] U.S. Cl. ................................ 525/221; 525/194; 525/195; 525/196; 525/214; 525/78; 524/522
[58] Field of Search ................................ 525/221, 214

[56] References Cited

U.S. PATENT DOCUMENTS

| | | | |
|---|---|---|---|
| 2,356,128 | 8/1944 | Thomas et al. | 260/79 |
| 3,256,366 | 6/1966 | Corbelli | 525/192 |
| 3,454,676 | 7/1969 | Busse | 525/330.2 |
| 3,968,065 | 7/1976 | Morris et al. | 525/221 |
| 4,348,501 | 9/1982 | Coran et al. | 525/179 |
| 4,532,298 | 7/1985 | Kimura et al. | 525/96 |
| 4,593,062 | 6/1986 | Puydak et al. | 524/426 |
| 4,639,487 | 1/1987 | Hazelton et al. | 525/221 |
| 4,851,468 | 7/1989 | Hazelton et al. | 525/221 |

FOREIGN PATENT DOCUMENTS

| | | |
|---|---|---|
| 0055848 | 7/1982 | European Pat. Off. . |
| 1096879 | 12/1967 | United Kingdom . |
| 1424041 | 2/1976 | United Kingdom . |
| 2179046 | 2/1987 | United Kingdom . |

OTHER PUBLICATIONS

"Synthetic Rubber" G. S. Whitby (1954) John Wiley & Sons, New York (pp. 608–609).
"Encyclopedia of Chemical Technology" 3rd Edition, vol. 8 (1979), (pp. 470–484).

Primary Examiner—Carman J. Seccuro, Jr.
Attorney, Agent, or Firm—M. B. Kurtzman; H. Cohen; J. Schneider

[57] ABSTRACT

An elastomeric composition comprising a major proportion by weight of a rubber comprising a halobutyl rubber (e.g. 75 to 95%) and a minor proportion by weight (e.g. 5 to 25%) of a copolymer of an olefin, e.g. ethylene, and an unsaturated carboxylic acid e.g. acrylic acid. This composition may be covulcanised with a general purpose rubber e.g. natural rubber, to which it has adequate adhesion. Thus a natural rubber tyre carcass may be covulcanised with a tyre inner liner formed of this composition.

7 Claims, No Drawings

ELASTOMERIC COMPOSITIONS AND PROCESSES FOR THEIR PRODUCTION

This is a continuation, of application Ser. No. 873,527, filed Apr. 21, 1992 which is a continuation of U.S. Ser. No. 377,347, filed Jul. 7, 1989 both now abandoned, which is based on UK Serial No. 8816310.0 filed Jul. 8, 1988.

This invention relates to elastomeric compositions and processes for their preparation.

Although halobutyl rubbers are much used, for example for tyre liners they do have some disadvantages. These include the difficulty of processing and more particularly obtaining a fast cure rate without causing scorching; of obtaining a satisfactory balance between the green strength (strength of uncured rubber) and the stress relaxation and of obtaining high cured adhesion onto general purpose rubber (GPR) substrates.

We have found that these disadvantages are substantially overcome and other advantages achieved by adding an olefin polymer with anionic groups to the halobutyl rubber instead of using the halobutyl rubber on its own. Such mixtures have not been suggested or disclosed in the art as far as we have been able to ascertain:

U.S. Pat. No 4,348,501 discloses blends of a thermoplastic carboxy containing ethylene copolymer and cross-linked epichlorhydrin dispersed throughout the resin as small discrete particles. The resulting blend is processed as a thermoplastic material and is not thermoset after a curing step.

GB 2179046 A discloses blends of different rubbers, with optionally added brominated butyl rubber and carboxylated rubbers for vibration mounts. There is no disclosure of the utility of bromobutyl and non-elastomer ethylene based polymers containing carboxy groups.

GB 1424041 discloses a rubber containing material which has a low viscosity by the use of a compatible liquid polymer or copolymer of a diene which takes past in a curing process not employing sulphur. The rubber may contain a reactive halogen but the normally occurring allylic halogen of bromobutyl or chlorobutyl is not identified as a possible active group. The diene derieved component is liquid. The diene component may be copolymerised with an amonic group containing copolymer but 75% remains diene derived and there is no ethylene based monomer component.

EP A 55 848 discloses a water absorbing rubber based composition with added thereto a cross-linked waterabsorbing resin of a polymer having at least 40 mol % of a carboxyl group containing component. There is no teaching of the use of the reaction of allylic halogen in, say, bromobutyl or the use of a olefin polymer with a low carboxy group content. There is no disclosure of the joint curing of an halobutyl, carboxy-containing olefin polymer into a fairly hydrophobic, high modulus material for use in applications where rubber or butyl was used singly previously, such as for firewalls.

GB 1096 879 suggests use (see p5 line 25) of a blend of sulphonated polymers of perfluorostyrene with other vinyl polymers. Page 2 line 1 indicates that the halo-substituents are not reactive. There is no teaching to use a reactive halogen containing polymer in conjunction with an olefin polymer to provide cross-linkable blend.

U.S Pat. No.4,593,062 discloses a thermoplastic mouldable composition having a continuous phase a thermoplastic material and in situ, dynamically vulcanised rubber particles containing halobutyl to give a DVA or TPO. The thermoplastic material is a polyolefin resin which according to a not-preferred embodiment may be a copolymer of ethylene with acrylic acid. The rubber also essentially contains a polychloroprene rubber. The proportions suggested for polychloroprene, the olefin resin and the halogenated butyl rubber are 1:1:1 (of claim 8) or from 90 to 110 wt % by reference to the polyolefin (see colum 7). The U.S. Pat. No. 4,593,062 does not disclose a thermoset composition of which a minor proportion is olefinic anionic group containing copolymer nor a composition free of chloroprene or acomposition which can incorporate a cure system in a green state for subsequent curing. The olefin resin and halogenated butyl rubber are not intimately mixed to permit and promote their mutual cross linking and compatibility.

In accordance with this invention there is firstly provided a process for preparing an elastomeric composition which includes preparing a master blend of polymeric components comprising a major preparation by weight of a rubber containing reactive halogen and a minor proportion by weight of a copolymer containing anionic groups of an olefin and any fillers at a first temperature, cooling the mixture and adding a cross-linking system at a second temperature below the first and cross-linking the mixture at a third temperature above the first temperature.

The reacting halogen may be the allylic halogen of halobutyl rubber. The anionic groups may be the nonneutralised and/or neutralised carboxylic acid groups of ethylene copolymers. The uncured strength of the blend is improved.

Secondly there is provided an elastomeric composition comprising a major proportion by weight of a rubber comprising a rubber containing reactive halogen and a minor proportion by weight of polymer containing anionic groups such as a copolymer of an olefin and an unsaturated carboxylic acid. Preferably the polymer content of the blend consists predominantly of the reactive halogen containing rubber and the olefin copolymer. This blend may be stored etc. without the presence of a cross-linking system.

With a major proportion of a rubber containing reactive halogen is meant for example a least 50% by weight of halobutyl rubber. Advantageously substantially no non-functional olefin resin is present. Advantageously substantially no polychloroprene is present. Hence the composition preferably is a binary blend consisting essentially—as far as polymeric components is concerned—of the halobutyl and anionic group containing polymer. The amounts and nature of the components of such blends should be selected to provide an intimately mixed blend without a continuous thermoplastic olefin polymer phase.

The rubber is preferably a halobutyl rubber, i.e. a halogenated butyl rubber such as a copolymer of 70–95.5% by weight of combined isoolefin having from 4 to 8 carbon atoms per molecule and 0.5 to 30% by weight of combined multiolefin having 4 to 14 carbon atoms per molecule. Preferably the butyl rubber from which the halobutyl rubber is derived contains 85 to 99.5% by weight (especially 95 to 99.5% by weight) of a $C_4$ to $C_7$ isoolefin, such as isobutene and 0.5 to 15% by weight (especially 0.5 to 5% by weight) of a conjugated $C_4$ to $C_{10}$ multi-olefin. The textbook "Synthetic Rubber" by G. S. Whithby (1954 edition by John Wiley &

Sons Inc.) pp 608–609 and "Encyclopaedia of Chemical Technology", 3rd Etition Vol. 8 (1979) pp 470–484 give a description of butyl rubber.

The preparation of butyl-type rubbers is amply described an, in general, it consists of the reaction product of a $C_4$-$C_7$ isoolefin (preferably isobutylene) with a $C_4$-$C_{10}$ (preferably a $C_4$-$C_6$) conjugated diolefin, such as isoprene, budadiene, dimethyl butadiene, piperylene, etc. The reaction product of isobutylene and isoprene is preferred. The preparation of butyl rubber is also described in U.S Pat. No. 2,356,128 which is incorporated herein by reference.

Conventional high molecular weight butyl rubber generally has a number average molecular weight of about 25,000 to about 500,000, preferably about 80,000 to about 300,000 especially about 100,000 to about 250,000; and a Wijs Iodine No. of about 0.5 to 50, preferably 1 to 20. More recently low molecular weight polymers have also been prepared which have number average molecular weights of from 5,000 to 25,000 and unsaturation expressed as mole %, of 2-10.

Chlorinated and brominated butyl rubber generally contain at least 0.5 weight % combined halogen and up to 1 atim of halogen per double bond in the copolymer; chlorobrominated butyl rubber generally contains from 1.0 to 3.0 weight % bromine and from 0.05 to 0.5 weight % chlorine.

If the rubber forming the major proportion by weight of the composition of this invention is a mixture of a halobutyl rubber and another rubber, the other rubber can for example be natural rubber (NR), polybutadiene rubber or styrene-butadiene rubber (SBR).

When a mixture of rubbers is used the halobutyl rubber usually forms a major proportion by weight of the mixture, for example 50 to 80 weight %, e.g. about 60 weight %.

The copolymer is derived from olefin (with which term generally mono-olefins are indicated) and an unsaturated carboxylic acid. The olefin is preferably of low molecular weight and $C_2$ to $C_5$ olefins are useful. Particularly preferred olefins are propylene and especially ethylene.

The unsaturated carboxylic acid is preferably an ethylenically unsaturated carboxylic acid and should contain one or more double bonds. It may be a polycarboxylic acid, e.g. an alpha-beta ethylenically unsaturated carboxylic acid preferably containing 4 to 8 carbon atoms e.g. 4 to 6 carbon atoms per molecule, such as maleic acid, fumaric acid or itaconic acid. Preferably however, it is a monocarboxylic acid, e.g. an alpha-beta ethylenically unsaturated carboxylic acid having 3 to 8 carbon atoms e.g. 3 to 5 carbon atoms per molecule, for instance, acrylic acid, methacrylic acid, crotonic acid or ethacrylic acid. In general ethylenically unsaturated acids having 2 to 5 carbon atoms (not including the acid group carbon(s)) per molecule are preferred.

Acrylic acid is the most preferred acid.

It is preferred that the copolymer has at least 50 mole % of olefin e.g. 60 to 80 mole % of olefin. The number average molecular weight of the ethylene-acrylic acid copolymers is typically between 500 and 5000, e.g. 1500 to 4000, the acid number between 10 and 200, preferably 20 to 130 mgKOH/g and the density between 0.91 and 0.95 usually between 0.925 and 0.945.

The Vicat softening point of the copolymers is usually between 55° and 90° C. and the melting point between 85° and 110° C. The melt index determined by ASTM method D-1238 is usually 1 to 100 g/10 minutes, e.g. from 1.5 to 8.5 g/10 minutes for ethylene/acrylic acid copolymers and from 1.0 to 6.0 g/10 minutes for ethylene/methacrylic acid copolymers, the value increasing with increasing ethylene content.

A preferred copolymer of ethylene and acrylic acid has the following properties:

| | |
|---|---|
| Melt index: | 8.0 g/10 min |
| Density: | 0.931 g/cm$^3$ |
| Acid number: | 43 mg KOH/g |
| Melting point: | 103° C. |
| Vicat softening point: | 86° C. |
| Tensile at break: | 16.5 MPa |
| Elongation at break: | 600% |
| E modulus: | 186 MPa |
| Dart impact strength *: | 300 g $F_{50}$ |

* 50 micron film 2.2:1 blow up ratio.

The copolymers are usually prepared by polymerising the monomers in the vapour phase at high pressure, usually 1500 to 2500 bars, at a temperature usually between 150° C. and 250° C. preferably between 190° C. and 220° C., using a free radical initiator. Suitable initiators are peroxyesters such as peroxypivalates, peroctoates or perbenzoates or a mixture of these or peroxides.

The polymerisation reaction can be continuous and the product can be continually withdrawn from the reactor as it is formed. The viscosity of the product is controlled by using a transfer agent such as isobutylene. Other suitable transfer agents are compounds such as an alcohol, a ketone, an aldehyde or an aliphatic or aromatic hydrocarbon.

It is preferred that the weight ratio of olefin copolymer to rubber comprising halobutyl rubber is between 40:60 and 5:95 preferably between 25:75 and 10:90 especially about 15:85.

To obtain the composition of this invention in a usable form, for example as a sheet or a slab, it is desirable that the copolymer and rubber comprising halobutyl rubber be submitted to high shear mixing generally without a cross-linking/vulcanising system. This can be achieved by introducing the blend of rubber and copolymer into a mixer such as an internal mixer or a Banbury mixer. The blend is then subjected to thorough mixing.

It is usual to add one or more additives or fillers to the mixture of rubber and copolymer. Examples of such additives with typical amounts (in parts by weight based on 100 parts by weight of rubber plus copolymer) are carbon black (e.g. GPF, HAF) 40 to 70 e.g. 50, oil (e.g. naphtenic oil Flexon 580 or paraffinic oil Flexon 876 or aromatic oil Dutrex R) 5 to 10 e.g. 7 to 8; stearic acid, 0.5 to 1.5, e.g. 1.0. The curing/vulcanising system components, generally added later at a low inactive temperature, may include zinc oxide 1 to 10 e.g. 3; sulphur 0.1 to 1.0 e.g. 0.5; MBTS (mercapto benzo thiazyl disulphide) 0.5 to 2.0, e.g. 1.5 and zinc steatate, 1.0 to 5.0 e.g. 1.5. The zinc oxide, sulphur, MBTS and zinc stearate constitute only one of the cure systems which may be used in practice. Other cure system variations are possible. The cure system incorporates a neutralising agent which can help to form ionomers and also contributes to linking of the copolymer and the rubber.

To obtain the composition of the invention in as for example a sheet, after mixing thoroughly with or without additives in the mixer, it can be extruded or calendered. The sheet thereby obtained is still in the green or uncured state. The addition of the acid group containing polymer appears to help in avoiding premature undesirable curing.

The composition thereby obtained has the following advantages over pure halobutyl rubber: Mooney Scorch much improved especially in the case of chlorobutyl; the $T_{90}$ technical cure time is shortened by nearly 25% at 150° C., the green strength is increased (highest modulus of elasticity), hardness and particularly hot modulus as shown on the rheographs; and very importantly there is better adhesion to an elastomer e.g. general purpose rubber.

Accordingly, this invention also provides the use of a composition having good adhesion to an elastomer, said composition comprising an intimately mixed blend of a major proportion by weight of a rubber comprising a halobutyl rubber and a minor proportion by weight of a copolymer of an olefin and an unsaturated carboxylic acid.

When using the adhesive properties of the composition of this invention to adhere to an elastomeric substrate, the substrate and the composition should preferably be covulcanised. Accordingly this invention provides an elastomeric composition comprising an elastomeric substrate supporting an intimately mixed blend of a major proportion by weight of a rubber comprising a halobutyl rubber and a minor proportion by weight of a copolymer of an olefin and an unsaturated carboxylic acid, said substrate and said blend having been co-covulcanised.

The elastomeric substrate can comprise any rubber or mixture of rubbers, but is preferably general purpose rubber, e.g. natural rubber polybutadiene rubber, styrene-butadiene rubber, carboxylated styrene-butadiene rubber, carboxylated styrene-butadiene rubber, polyisoprene rubber, acrylonitrile-butadiene-styrene rubber or any mixture thereof.

For one particularly suitable application the substrate is the carcass of a tyre and the blend is the tyre inner liner. In this particular case the carcass is usually natural rubber or a blend of natural rubber and styrene-butadiene rubber (SBR). To obtain the desired tyre the carcass and inner liner and other components (e.g. tread, sidewall, beads) are moulded and the "green" (uncured) tyre is passed to a curing press where the tyre is vulcanised. This is achieved by raising the temperature of and increasing the pressure on the tyre. Typically, the temperature is 120° C. to 200° C., e.g. about 150° C. and the pressure is 1 to 10 Pa e.g. about 5 Pa. The curing time is typically 15 min to 1 hour, for example about 30 minutes.

Cured tyres manufactured using as inner liner the combination of an olefin copolymer and a rubber comprising a halobutyl rubber compared with those made using only halobutyl rubber as the inner liner have the following advantages:

The modulus of elasticity, and tensile strength are strongly improved, particularly with chlorobutyl. The basic cured adhesion (i.e. a measure which takes account of difference in modulus of halobutyl compounds) onto natural rubber or natural rubber/SBR carcasses is generally improved, particularly in the case of chlorobutyl. For chlorobutyl, the flex to fatigue characteristics are strongly improved. The blend responds to cure system chemicals in the same overall manner as natural rubber, so facilitating optimisation of process conditions. Whilst the green strength is higher, the fast stress decay or low elastic memory improves processing and product quality.

EXAMPLE 1

Two different blends were prepared based on chlorobutyl rubber and one containing a copolymer of ethylene and acrylic acid. Two other blends were prepared based on bromobutyl rubber and one containing the same copolymer of ethylene and acrylic acid.

The chlorobutyl rubber (Chlorobutyl 1066 of Exxon Chemical Company) and the bromobutyl rubber (Bromobutyl 2222 of Exxon Chemical Company) had the following properties:

| GRADE | 1066 | 2222 |
|---|---|---|
| Specifications | | |
| Mooney Viscosity,[1] | | |
| ML 1 + 8 at 100° C. | — | — |
| ML 1 + 8 at 125° C. | 38 ± 5 | 32 ± 5 |
| Antioxidant, Nonstaining, wt % | 0.01–0.20 | 0.01–0.20 |
| Ash, wt. % | 0.5 max. | 0.7 max. |
| Bale Weight, kg. | 34 ± 1% | 34 ± 1% |
| Chlorine, wt. % | 1.2 ± 0.1 | — |
| Cure Characteristics:[2][3] | | |
| Maximum Torque ($M_H$), dN.m | 43 ± 7 | 37 ± 7 |
| Minimum Torque ($M_L$), dN.m | 16 ± 4.5 | 15 ± 4.5 |
| Water Content, wt. % | 0.3 max. | 0.3 max. |
| Typical Inspections | | |
| Bromine, wt. % | — | 2 |
| Chlorine, wt. % | 1.2 | — |
| Colour | White to Light Amber | Offwhite to Amber |
| Cure Characteristics:[2][3] | | |
| Scorch Time (ts 2), mins. | 2.5 ± 2 | 5 ± 2.5 |
| 50% Cure Time (t'50), mins. | 6 ± 3 | 9 ± 3 |
| 90% Cure Time (t'90), mins. | 13 ± 4 | 12 ± 4 |
| Specific Gravity | 0.92 | 0.93 |
| Stabiliser (Epoxidised Soyabean Oil), wt. % | | 1.5 |

[1]Mooney Viscosity: ISO R 289, radial cavity machines.
[2]Determined on a standard compound of the following formulation; in accordance with ASTM D3958:
Exxon Chlorobutyl 100
HAF IRB No. 6 40
Stearic Acid (NBS 372) 1
Zinc Oxide (NBS 370) 5
[3]Oscillating Disc Rheometer Testing in accordance with ASTM D2084; Temperature 160° C., Frequency 100 cpm, 30 min test, arc ± 3 degrees, no preheat, micro die and rotor.

The ethylene copolymer (TR5000) contained 94 weight % of ethylene units and 6 weight % of acrylic acid units. Its other properties were as follows:

| Property | Unit | ASTM Method | Value |
|---|---|---|---|
| Melt index | g/10 min | D1328 | 8.0 |
| Density | g/cm$^3$ | D792 | 0.931 |
| Acid number | mg KOH/g | — | 47.0 |
| Melting point | °C. | DSC* | 103.0 |
| Vicat softening point | °C. | D1525 | 86.0 |
| Tensile at break | MPa | D638 | 17.0 |
| Elongation at break | % | D638 | 600.0 |
| E-Modulus | MPa | D638 | 186.0 |
| Dart impact strength** | gF50 | D1709 | 300.0 |
| Haze** | % | D1003 | 5.0 |
| Gloss** | % | D2457 | 9.5 |

*Differential scanning calorimeter
**50 micron film 2.2:1 Blow-up ratio.

Other additives which were included in the four blends were carbon black (GPF N-660), paraffinic oil (Flexon 876), stearic acid, zinc oxide, sulphur, mercapto benzo thiazyl disulphide (MBTS) and zinc stearate. The exact composition (in parts by weight) of the four blends A, B, C and D were as follows:

|  | A | B | C | D |
|---|---|---|---|---|
| Chlorobutyl rubber | 100 | 100 | — | — |
| Bromobutyl rubber | — | — | 100 | 100 |
| Ethylene copolymer | — | 15 | — | 15 |
| GPF N-660 | 50 | 50 | 50 | 50 |
| Flexon 876 | 8 | 8 | 8 | 8 |
| Stearic acid | 1 | 1 | 1 | 1 |
| Zinc oxide | 3 | 3 | 3 | 3 |
| Sulphur | 0.5 | 0.5 | 0.5 | 0.5 |
| MBTS | 1.5 | 1.5 | 1.5 | 1.5 |
| Zinc stearate | 2 | 2 | 2 | 2 |

The four blends were each thoroughly mixed in a small Banbury mixer. For the first 1.5 minutes the halobutyl rubber, one third the carbon black and all the ethylene copolymer were mixed. The remainder of the carbon black was then added and the paraffinic oils and all the other additives were added and the mixing continued for another 2.5 minutes until a temperature of 140° C. was reached. The blends were then dumped and cooled down.

After cooling to room temperature, the blends were then reintroduced into the mixer, the zinc oxide, sulphur, MBTS and zinc stearate were added and the compounds were mixed and dumped at 90° C.

Thereafter the blends were placed in a mould and cured at a temperature of 180° C. for 15 minutes under pressure.

Various physical properties were measured for each of the blends A, B, C and D and the results are given in Table 1.

The Mooney viscosity, stress relaxation, green strength and self-tack relate to the uncured blends and the other data relate to the cured blends.

TABLE 1

| COMPOUNDS PROPERTIES | | A<br>CIIR 1066 | B<br>CIIR 1066 +<br>TR 5000 | C<br>BIIR 2222 | D<br>BIIR 2222 +<br>TR 5000 |
|---|---|---|---|---|---|
| 1. Mooney Viscosity | 1 + 4 | 53.5 | 54 | 53 | 53 |
| ML at 100° C. | 1 + 8 | 52.5 | 53 | 51.5 | 52 |
| 2. Mooney Scorch | 3 pts | 7.7 | 9.2 | 13.3 | 7.3 |
| MS at 135° C. | 5 pts | 8.55 | 13.5 | 14.4 | 15.0 |
|  | 10 pts | 9.4 | 20.3 | 15.7 | 20.4 |
| 3. Rheometer | ML | 15 | 15 | 13.8 | 14 |
| 5° arc at 150° C. | MH | 35 | 37.2 | 31.5 | 34 |
|  | ts 2 | 3.25 | 5.25 | 5.5 | 5.25 |
|  | tc 50% | 5.25 | 16 | 9.15 | 13.4 |
|  | tc 90% | 42 | 32 | 37.25 | 29.4 |
| 4. 5° arc at 180° C. | ML | 12 | 12.8 | 11.5 | 11.6 |
|  | MH | 27.2 | 31.8 | 28.5 | 31.8 |
|  | ts 2 | 1.18 | 2.10 | 1.75 | 2.10 |
|  | tc 50% | 1.80 | 3.90 | 2.60 | 3.37 |
|  | tc 90% | 7.75 | 7.60 | 7.90 | 6.50 |
| 5. Physical Properties | | | | | |
| Original | | | | | |
| 15' at 180° C. | | | | | |
| Hardness | Sh. A | 38 | 52 | 41 | 53 |
| M 100% | MPa | .96 | 2.0 | 1.0 | 2.0 |
| M 300% | MPa | 3.3 | 5.5 | 3.5 | 5.5 |
| Tensile | MPa | 8.7 | 10.9 | 11.2 | 12.0 |
| Elongation | % | 630 | 600 | 770 | 660 |
| Tear | N/mm | 33.8 | 37.6 | 39.0 | 37.9 |
| Aged 3 d @ 125° C. | | | | | |
| Hardness | Sh. A | 42.5 | 57.5 | 43.5 | 58 |
| M 100% | MPa | 1.2 | 2.6 | 1.3 | 2.5 |
| M 300% | MPa | 4.7 | 7.9 | 4.8 | 7.4 |
| Tensile | MPa | 8.8 | 11.6 | 11.6 | 11.9 |
| Elongation | % | 540 | 450 | 710 | 520 |
| Tear | N/mm | 31.7 | 35.5 | 36.4 | 39.5 |
| 6. Stress relaxation | | | | | |
| Stress at 100% ext. | MPa $10^{-2}$ | 20.6 | 22.7 | 21.0 | 27.7 |
| Decay time | Sec | 25 | 22 | 21 | 21 |
| Relaxation rate | MPa $10^{-2}$ sec$^{-1}$ | 0.42 | 0.51 | 0.5 | 0.68 |
| 7. Continuous Stress Strain (Green strength) | | | | | |
| 100% ext. | MPa $10^{-2}$ | 20.2 | 22.5 | 21.4 | 28.0 |
| 200% | | 17.1 | 17.9 | 17.7 | 20.7 |
| 300% | | 13.8 | 13.4 | 13.8 | 12.4 |
| 400% | | 10.5 | 9.2 | 9.4 | 7.3 |
| 500% | | 7.1 | 5.8 | 5.3 | 4.9 |
| 8. Self-Tack (Monsanto Tel-Tak) | | | | | |
| 16 Load 30" × $10^{-3}$ MPa | | 239 | 232 | 232 | 211 |
| 9. AMINCO permeability at 65° C. (replicate measurements) | | | | | |
| Q = $10^{-8}$ cm$^3$ cm · cm$^2$ sec$^{-1}$ atm$^{-1}$ | | 3.2/3.1 | 3.2/3.2 | 3.2/3.1 | 3.7/3.6 |
| 10. MONSANTO Flex CAM 24 | Min. K.C. | 36 | 108 | 207 | 46 |
|  | Median* K.C. | 100 | 253 | 377 | 196 |
|  | Max. K.C. | 321 | 388 | 583 | 313 |
| 11. Basic adhesion** to | | | | | |

TABLE 1-continued

| COMPOUNDS PROPERTIES | A<br>CIIR 1066 | B<br>CIIR 1066 +<br>TR 5000 | C<br>BIIR 2222 | D<br>BIIR 2222 +<br>TR 5000 |
|---|---|---|---|---|
| NR/Carcass, RT/100° C., kN/m | 2.5/0.8 | 3.0/1.0 | 2.9/1.5 | 3.6/1.6 |
| NR/SBR Carc, RT/100° C., kN/m | 1.9/0.75 | 3.3/1.0 | 1.8 | 2.3 |
| Interfacial separations in all cases | | | | |
| 12. Aged 2 days at 100° C. | | | | |
| NR/Carcass, RT/100° C., kN/m | 2.1/1.2 | 2.1/1.1 | 2.1/1.3 | 1.8/1.9 |
| NR/SBR Carc, RT/100° C., kN/m | 2.1/1.0 | 1.4/0.8 | 1.4/0.9 | 1.5/0.9 |
| Interfacial separations in all cases | | | | |

*Average of 3rd and 4th values
**See test method in appendix

In general, it can be seen that blends B and D show advantages over respectively A and C in terms of scorch/cure time balance, improved modulus and tensile strength, green strength and stress relaxation rate, improved "true" or basic adhesion to NR or NR/SBR substrates. This indicates the advantage of the inclusion of the ethylene copolymer in the blends.

EXAMPLE 2

An elastomeric blend H was prepared by mixing in a Banbury mixer 60 parts by weight of the chlorobutyl rubber used in Example 1, 40 parts by weight of natural rubber, 70 parts by weight of GPF carbon black, 50 parts by weight of whiting, 12 parts by weight of paraffinic oil Flexon 876, 1 part by weight of stearic acid, 3 parts by weight of zinc oxide, 1 part by weight of Vultac (an alkyl phenol disulphide curing agent), 1 part by weight of MBTS and 2 parts by weight of zinc stearate.

For comparison purposes three other blends E, F and G were prepared and these were the same as blend H except that respectively 5, 10 and 15 phr (parts by weight per hundred parts by weight of halobutyl plus natural rubber), of the ethylene copolymer used in Example 1 were also added. Two other blends I and J were also prepared, these being the same as blend H except that respectively 0.2 and 0.5 phr (parts by weight per hundred parts by weight of chlorobutyl plus natural rubber), of magnesium oxide (Maglite D) were also added.

The blends E, F, G, H, I and J were press-cured at 180° C. for 8 minutes (blends E, F and G) 7 minutes (blend H) and 15 minutes (blends I and J).

Various physical properties for each of the blends were measured in each case and the results are given in Table 2. The Mooney viscosity and self-tack relate to the uncured blends and the other data relate to the cured blends.

TABLE 2

| Blend | | + Copolymer (PMR) | | | CONTROL |
|---|---|---|---|---|---|
| | | 5<br>E | 10<br>F | 15<br>G | H<br>CONTROL |
| MOONEY VISCOSITY | | | | | |
| ML at 100° C. | 1 + 4 | 44 | 46.5 | 45.5 | 43 |
| | 1 + 8 | 44.5 | 46 | 45 | 42 |
| MOONEY SCORCH | | | | | |
| MS at 135° C. (min) | 3 Pts | 11.70 | 10.90 | 11.10 | 8.0 |
| | 5 Pts | 13.80 | 13.70 | 14.25 | 10.10 |
| | 10 Pts | 18 | 18.10 | 18.10 | 13.80 |
| RHEOMETER | | | | | |
| 5° ARC AT 150° C. | ML | 11 | 11 | 10.8 | 10 |
| | MH | 49 | 48 | 47 | 52 |
| | TS 2 | 6.25 | 6.25 | 6.25 | 5 |
| | TC 50% | 24.75 | 24.75 | 24.25 | 21.5 |
| | TC 90% | 48.50 | 48.60 | 47.50 | 44 |
| 5° ARC AT 180° C. | ML | 8.5 | 9.1 | 9.1 | 8.3 |
| | MH | 43.8 | 43.8 | 42.6 | 45 |
| | TS 2 | 1.70 | 1.70 | 1.70 | 1.40 |
| | TC 50% | 4.05 | 4.30 | 4.10 | 3.52 |
| | TC 90% | 7.90 | 8.40 | 8.20 | 6.70 |
| 3° ARC AT 180° C. | ML | 7.5 | 7.9 | 7.5 | 7.5 |
| | MH | 34 | 34.8 | 33.4 | 36.1 |
| | TS 2 | 1.9 | 1.8 | 1.7 | 1.55 |
| | TC 50% | 3.9 | 4.0 | 3.9 | 5.3 |
| | TC 90% | 7.50 | 8.0 | 7.50 | 5.80 |
| PHYSICAL PROPERTIES | | | | | |
| CURE TIME AT 180° C. (min) | | 8 | 8 | 8 | 7 |
| ORIGINAL | | | | | |
| HARDNESS SHORE A | | 60 | 60.5 | 61 | 58.5 |
| MODULUS 100% | MPa | 2.5 | 2.4 | 2.4 | 2.3 |
| MODULUS 300% | MPa | 7.2 | 6.9 | 6.6 | 7.5 |
| TENSILE | MPa | 8.8 | 8.3 | 8.3 | 9.1 |
| ELONGATION | % | 370 | 360 | 380 | 360 |
| TEAR | N/mm | 25.8 | 25.5 | 25.4 | 25.2 |
| AGED 3 DAYS AT 125° C. | | | | | |
| HARDNESS SHORE A | | 68(+8) | 68(+7½) | 67(+6) | 67(+8½) |
| MODULUS 100% | MPa | 3.0 | 2.8 | 2.9 | 2.7 |
| MODULUS 300% | MPa | — | — | — | — |
| TENSILE | MPa | 4.8 | 4.6 | 4.6 | 4.1 |

TABLE 2-continued

| | | | | | |
|---|---|---|---|---|---|
| ELONGATION | % | 210 | 230 | 220 | 220 |
| TEAR | N/mm | 17.5 | 18.0 | 18.1 | 17.1 |
| SELF-TACK (MONSANTO TEL-TAK) | | | | | |
| 16 OZ LOAD, 30" (× 10⁻³ MPa) | | 253 | 281 | 274 | 239 |
| MONSANTO FLEX | | | | | |
| CAM 24 | MIN. KC | 12.1 | 12.2 | 11.8 | 8.9 |
| | MEDIUM. KC | 17.1 | 13.0 | 13.2 | 13.1 |
| | MAX. KC | 20.2 | 16.2 | 16.9 | 18.7 |

| | | MAGLITE 0 (PMR) | |
|---|---|---|---|
| | | 0.2 | 0.5 |
| Blend | | I | J |
| MOONEY VISCOSITY | 1 + 4 | 47 | 49 |
| ML at 100° C. | 1 + 8 | 46.5 | 48.5 |
| MOONEY SCORCH | 3 Pts | 11.60 | 9.80 |
| MS at 135° C. (min) | 5 Pts | 13.90 | 13.30 |
| | 10 Pts | 17.10 | 19.20 |
| RHEOMETER | | | |
| 5° ARC AT 150° C. | ML | NOT AVAILABLE | NOT AVAILABLE |
| | MH | NOT AVAILABLE | NOT AVAILABLE |
| | TS 2 | NOT AVAILABLE | NOT AVAILABLE |
| | TC 50% | NOT AVAILABLE | NOT AVAILABLE |
| | TC 90% | NOT AVAILABLE | NOT AVAILABLE |
| 5° ARC AT 180° C. | ML | NOT AVAILABLE | NOT AVAILABLE |
| | MH | NOT AVAILABLE | NOT AVAILABLE |
| | TS 2 | NOT AVAILABLE | NOT AVAILABLE |
| | TC 50% | NOT AVAILABLE | NOT AVAILABLE |
| | TC 90% | NOT AVAILABLE | NOT AVAILABLE |
| 3° ARC AT 180° C. | ML | 6.9 | 7 |
| | MH | 27.5 | 22.7 |
| | TS 2 | 2.1 | 2.00 |
| | TC 50% | 4.2 | 4.05 |
| | TC 90% | 8.8 | 12.0 |
| PHYSICAL PROPERTIES | | | |
| CURE TIME AT 180° C. (min) | | 15 | 15 |
| ORIGINAL | | | |
| HARDNESS SHORE A | | 54.5 | 49.5 |
| MODULUS 100% | MPa | 1.8 | 1.6 |
| MODULUS 300% | MPa | 6.0 | 4.7 |
| TENSILE | MPa | 7.5 | 6.3 |
| ELONGATION | % | 370 | 400 |
| TEAR | N/mm | 21.9 | 21.6 |
| AGED 3 DAYS AT 125° C. | | | |
| HARDNESS SHORE A | | 61(+6½) | 55(+5½) |
| MODULUS 100% | MPa | 2.0 | 1.6 |
| MODULUS 300% | MPa | — | — |
| TENSILE | MPa | 3.5 | 3.5 |
| ELONGATION | % | 250 | 280 |
| TEAR | N/mm | 15.9 | 14.6 |
| SELF-TACK (MONSANTO TEL-TAK) | | | |
| 16 OZ LOAD, 30" (× 10⁻³ MPa) | | 260/253 | 260/260 |
| MONSANTO FLEX | | | |
| CAM 24 | MIN. KC | 15.7 | 17.2 |
| | MEDIUM. KC | 21.6 | 28.6 |
| | MAX. KC | 24.8 | 37.4 |

It can be seen that as little as 5 phr of ethylene copolymer vis a vis the control blend H, results in an improved scorch and compared with blends I and J which have been "protected" by the addition of magnesium oxide, a better balance between scorch and cure time. Tensile strength and tear resistance are better for chlorobutyl rubber and copolymer blends than for blends I and J protected in terms of scorch time by the addition of magnesium oxide.

EXAMPLE 3

Blends K, L, M were prepared as follows:

| | K | L | M |
|---|---|---|---|
| Chlorobutyl 1066 | 100 | 100 | 100 |
| Carbon black GPF | 50 | 50 | 50 |
| Flexon 876 | 8 | 8 | 8 |
| Stearic acid | 1 | 1 | 1 |
| Polyethylene MI 709/10 min 00.913 | 10 | — | — |
| Escor TR 5000 | — | 10 | — |
| Escor TR 5100 (MI 8,9% AA) | — | — | 10 |

(all units are in parts by weight)

These were mixed at 140° C. for 4 minutes. No curing as such was performed. The blends were cooled and mixed with ZnO (3 parts), Sulphur (0.5 parts), MBTS (1.5 parts); Zn stearate (2 parts) at a low temperature of 100° C. and then press cured at 180° C.

The properties obtained were as follows:

| | K | L | M |
|---|---|---|---|
| ML (1 + 8) 100° C. | 56 | 55 | 58 |

-continued

|  | K | L | M |
| --- | --- | --- | --- |
| MS (t5) 135° C. | 7.1 | 10.0 | 15.1 |
| Rheometer arc ± 3 180° C. | | | |
| ML Min | 9.75 | 10 | 10.2 |
| MH Max | 18 | 24.2 | 27.5 |
| ts2 Scorch Min | 1.7 | 1.7 | 2.1 |
| tc90 Cure Min | 7.4 | 9.7 | 10.8 |
| Press Cure 180° C. 15 Min | | | |
| Hardness Store A | 44 | 50 | 53 |
| Modulus 100% MPa | 1.21 | 1.58 | 1.73 |
| Modulus 300% MPa | 3.28 | 4.37 | 4.78 |
| Tensile Strength MPa | 7.28 | 8.78 | 9.75 |
| Elong. at break % | 785 | 740 | 705 |

Blends M and L provide an improved Hardness modulus and Tensile Strength over blend K, illustrating that it is not merely the presence of an olefinic backbone chain which creates the improved products of the invention.

I claim:

1. A polymer composition having improved scorch/cure balance comprising:
   (1) a rubber selected from halogenated butyl rubber and blends of a major portion of halogenated butyl rubber with a minor portion of natural rubber, polybutadiene, and styrene butadiene rubber; and
   (2) an olefin polymer consisting of a copolymer derived from a $C_2$ to $C_5$ olefin and an unsaturated carboxylic acid wherein the weight ratio of said copolymer to said rubber is between about 15:85 and 5:95.

2. The polymer composition of claim 1 wherein said olefin is ethylene and said carboxylic acid is acrylic acid.

3. The polymer composition of claim 1 wherein said rubber is chlorobutyl rubber.

4. The polymer composition of claim 1 wherein said rubber is bromobutyl rubber.

5. A method for improving the scorch time of halobutyl rubbers comprising blending an olefin polymer consisting of a copolymer of a $C_2$ to $C_5$ olefin and an unsaturated carboxylic acid with a rubber selected from halogenated butyl rubber and blends of a major portion of halogenated butyl rubber with a minor portion of natural rubber, polybutadiene, and styrene butadiene rubber wherein in the blend the weight ratio of said copolymer to said rubber is between about 15:85 and 5:95.

6. The method of claim 5 wherein said rubber is a blend comprising a major portion of halobutyl rubber with a minor portion of a second rubber selected from the group comprising natural rubber, polybutadiene rubber, and styrene butadiene rubber.

7. The method of claim 5 wherein said olefin is ethylene and said acid is acrylic acid.

* * * * *